Oct. 11, 1955
C. C. HALL
2,720,598
ELECTRICAL CONTROL OR REGULATING SYSTEMS
Filed March 28, 1952
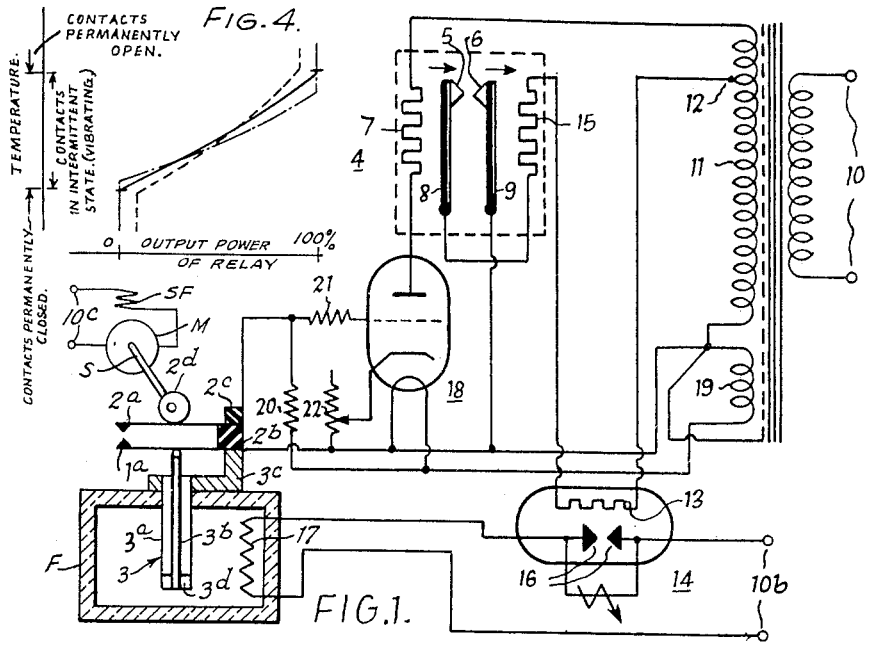
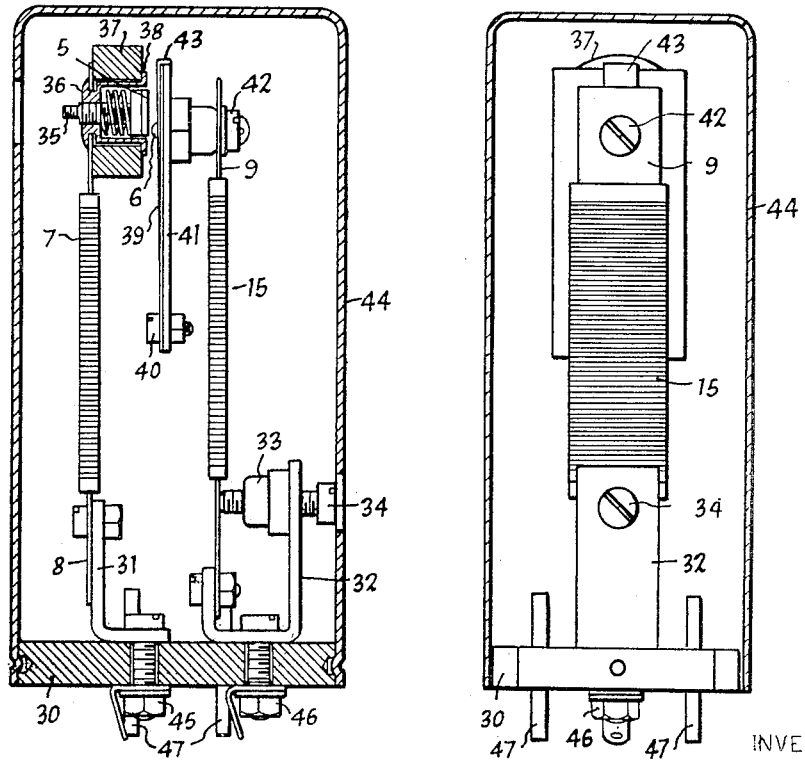
INVENTOR
Colin Charles Hall
By Lewis L. Bateman
ATTORNEYS

# United States Patent Office 2,720,598
Patented Oct. 11, 1955

2,720,598

ELECTRICAL CONTROL OR REGULATING SYSTEMS

Colin Charles Hall, Harlow, England, assignor to Sunvic Controls Limited, London, England, a company of Great Britain Application March 28, 1952, Serial No. 279,235

Claims priority, application Great Britain April 6, 1951

11 Claims. (Cl. 307—97)

This invention relates to electrical control or regulating systems of the kind comprising an element, hereinafter referred to as the sensing element, responsive to the magnitude of a quantity which is required to be controlled and may itself be of electrical, or any other nature, and means operative in accordance with response of said sensing element to deviation of the controlled quantity from the desired value, hereinafter referred to as the control point, for producing a restoring effect on the controlled quantity directed to return the latter to the desired value. The second-mentioned means may include output arrangements of electrical or any other desired kind according to requirements.

In a common form of control or regulating system of the kind referred to, the sensing element controls the relative positions of a pair of electrical contacts hereinafter referred to as the sensing or control contacts. In general such systems cannot be caused to operate satisfactorily by simple control of the restoring effect in accordance with the contacts being opened or closed for reasons which will hereinafter appear. According to the common practice in such control systems the contacts are provided with snap-action in order that chattering of the contacts with attendant troubles due to contact wear, radio interference and undesirably high frequency of operation of the control means, usually comprising an electromagnetic or thermal relay, shall be avoided. The sensing element and control contacts therefore operate with an overlap or differential and the accuracy with which the regulated quantity can be controlled is correspondingly reduced, descreasing as the overlap or differential is increased. It has not been considered feasible to operate such control systems without snap-action of the contacts, with a view to reducing the differential, since it is found that when the controlled quantity is changing slowly the contacts will then chatter either during the periods when the contacts are engaging one another, or disengaging one another, or at both times or continuously.

Arrangements have been proposed wherein the contacts operate without snap-action but at a low voltage of the order, for example, of 6 volts and carrying a small current, for example about 10 microamps, and operating through an electronic or other amplifier to control a main relay. In such arrangements, however, although the chattering of the control contacts can be tolerated, corresponding chatter of the main relay contacts controlling the load will arise so that the objections referred to above are merely transferred from the control contacts to the main relay contacts. It is then necessary that the main relay itself shall be provided with snap-action and also with a suitable time delay in order to prevent undesirably high frequency of operation.

According to the present invention, a control or regulating system of the kind referred to comprises in combination vibratory control contacts with the ratio of the time for which the contacts are closed to the period of the vibration cycle adjustable by response of the sensing element in dependence on the magnitude of the controlled quantity, and relay means responsive to the mean current in or voltage across said contacts, which relay means are connected or adapted to be connected to increase or reduce the energy input to the load according as said mean current or voltage deviates in one sense or the other from a predetermined value, hereinafter referred to as the control point. The relay means, as will hereinafter appear, may either operate in simple on-off fashion according to the deviation of the controlled quantity from the control point, or may be arranged so as periodically to open and close contacts thereof or otherwise periodically vary an output current thereof, at a frequency which need not be related to the frequency of vibration of the sensing contacts but which will produce a mean output which is proportional or substantially proportional to, or is some other function of, the deviation of the controlled quantity.

The control contacts may be arranged to vibrate by utilising the electrostatic forces present at the contacts whereby the contacts when open are drawn towards one another due to the voltage between them and are biased to the open position upon removal of this voltage consequent upon closure of the contacts, or may be vibrated by mechanical means provided for the purpose, for example motor-driven, electromagnetic or thermal actuating devices, or by extraneous vibrations which will usually be present in the apparatus with which the controlling system is associated. As will be clear to those skilled in the art, the contacts will generally be arranged with light supporting members and the vibration and frequency thereof can be controlled by suitable selection of the contact inertia and stiffness of such supporting members.

In carrying out the invention the main relay means will normally be energised under control of the sensing contacts through the interposition of amplifying means, such as a thermionic valve for example.

According to a further feature of the invention the main relay comprises a snap-action relay device having an operating circuit the condition of which is controlled by the position of the contacts of said relay so that operation of the contacts in either direction produces a modification of the resultant current applied to operate the relay in such sense as to neutralize the differential introduced into the main relay by the snap-action. The modification of the resultant operating current may be such as to neutralize wholly or in part, or to over-compensate, the effect of the differential. Where the control contacts are not vibrating the relay will operate in simple on-off fashion according as the output of the control contacts is indicative of the controlled quantity being above or below the control point, whereas if the control contacts are vibrating then the relay contacts will be maintained in intermittent engagement and the ratio between the contact closed periods of the main relay and the period of operation thereof will be dependent upon the mean output of the sensing contacts; this operation is described in more detail hereinafter.

Reference will now be made by way of example to the accompanying drawing, in which:

Fig. 1 is an electrical circuit diagram showing one embodiment of the invention, and Figs. 2 and 3 are respectively a main sectional side elevation and a partly sectional end elevation of a preferred construction of the relay device incorporated in the circuit arrangement of Fig. 1, and Fig. 4 is a temperature-relay output power curve included for explanatory purposes.

In Fig. 1, a pair of control contacts are shown at 1 and 2, being operable by a sensing element 3 which may respond to any desired quantity but for convenience will be assumed to be a temperature responsive element employed in the control of temperature of a furnace indicated diagrammatically at F. The element 3 may comprise a simple temperature responsive main element of any of the forms as commonly employed in thermostats; it is arranged to move the contact 1 toward and away from the co-operating fixed contact 2 with changes in the temperature of the furnace. In the example illustrated the sensing element 3 (shown in section) comprises an outer tube $3a$ and an inner rod $3b$ which are formed of materials having different coefficients of expansion with temperature; for example, said rod and tube may be of steel and copper respectively. The tube $3a$ is mounted in a bracket $3c$ supported on the furnace F while the rod $3b$ is connected at its lower end with the lower end of the tube $3a$ by means of a disc $3d$. The supporting means for the contacts 1 and 2 comprise respectively two cantilever spring blades $1a$ and $2a$ which are mounted on the bracket $3c$ by means of a block $2b$ and clamping strip $2c$, both of insulating material, and clamping screws (not shown) between said strip and the bracket $3c$. The spring blade $1a$ has a downward set so as to bear against the upper end of the rod $3a$ whereby the differential expansion in response to rise of temperature of the furnace will tend to raise the contact 1.

The support of the two contacts is such, by suitable choice of the mass and inertia of the contacts and the stiffness of the supporting means for the contacts, that the electrostatic forces produced in operation on a low voltage, for example of the order of 6 volts, will maintain the latter in vibration, or the vibration may be excited by extraneous vibration which is usually present, or may be produced mechanically, such as by a motor-driven cam, or an electromagnetic device or a thermal device superimposing a vibrating component on the relative movement of the contacts. The frequency of vibration may, for example, be of the order of 300 cycles per second. A motor driven cam is shown in Fig. 1. This cam $2d$ is mounted on a shaft S which is coupled with the armature M of an electric motor, shown as a series motor with a series field winding SF, for energization from the supply mains at $10c$. The spring blade $2a$ is given an upward set so that rotation of the armature M will cause the cam periodically to move the spring blade in a vertical plane thereby to move the contact 2 into and out of engagement with the contact 1. The arrangement is such that a small change in furnace temperature will modify the contact operation from a condition in which the contacts are permanently closed to a condition in which the contacts are permanently open, and for intermediate conditions over this range the percentage time of contact closure of the vibrating contacts will depend upon the furnace temperature and may conveniently be assumed to be proportional thereto.

The arrangement includes a thermally operated relay 4, a preferred construction of which will hereinafter be described with reference to Figs. 2 and 3. The relay includes snap-action contacts 5 and 6 and an operating element comprising a heating winding 7 energised through a suitable amplifier under control of the sensing contacts, the arrangement essentially being such, as will hereinafter be described, that the operation of the relay is dependent upon the mean output of the control contacts.

In the form shown in Fig. 1, the thermal relay comprises a pair of bimetal strips 8 and 9 which are arranged parallel or substantially parallel with one another, being fixedly mounted at adjacent ends on a suitable base member and carrying the contacts 5 and 6 at their free ends.

The contacts 5 and 6 are connected in circuit with the load. In the example illustrated the load is supplied from a transformer having a primary winding 10 adapted to be connected with the supply mains and a secondary winding 11 part of which is employed for energising the load in a circuit which proceeds from a tapping 12 of said winding, the operating element 13 of a relay 14, a heating winding 15 thermally associated with the bimetal strip 9, and contacts 5 and 6 to the lower end of the winding 11. The relay 14 may be of any suitable kind but is shown as a thermally operated vacuum switch having its contacts 16 included in series between the supply mains at $10b$ and the load 17, which in the embodiment assumed will comprise a heating winding of the furnace.

The function of the winding 15, as will hereinafter appear, is to provide a heating of the bimetal strip 9 which is controlled simultaneously with the energisation of the load; the winding 15 may therefore be connected either in series with the load 17, as is illustrated, or in parallel with the load, that is to say in parallel with the load 17 or in parallel with the operating element 13 of the relay 14 where the latter is employed.

The winding 7 associated with the other bimetal strip 8 is connected in the anode circuit of a thermionic valve 18, said anode circuit being energised from the transformer secondary winding 11. The cathode heater of the valve 18 is energised from a further winding 19 of the mains transformer and the grid of the valve is connected with the lower end of said further transformer winding through a pair of resistors 20 and 21, the connections thus being such that the grid is energised in counter-phase to the anode voltage. The cathode connection of the valve includes a variable resistor 22 for providing automatic bias in well known manner, whilst the contact 1 is connected with the negative end of this resistor and the contact 2 is connected with the common point between the resistors 20 and 21.

The bimetal strips 8 and 9 of the relay 4 are arranged so as to deflect in the same direction as one another with similar changes of temperature, whereby the relay is also compensated for variations of ambient temperature. Both heating elements move to the right in Fig. 1 with increase of temperature, that is to say energisation of winding 7 heats the bimetal strip 8 to tend to close the contacts and energisation of winding 15 heats bimetal strip 9 to tend to open the contacts. Windings 7 and 15 will hereinafter be referred to as the control and compensating windings.

In the operation of this arrangement, the sensing element is arranged so that increase of the furnace temperature tends to open the control contacts 1 and 2. When these contacts are open, the negative potential applied to the grid cuts off the anode current and the control winding 7 of the thermal relay is de-energised. It will be assumed, first, that the mechanical bias on the relay 4 is such that the snap-action contacts 5 and 6 thereof are then just open so that the compensating winding 15 is de-energised and also the relay contacts 16 will be opened to de-energise the load. On the other hand, when the control contacts 1 and 2 are closed, the bias on the valve is removed so that the latter conducts and after a short time delay the relay 4 closes its contacts 5 and 6 due to the heating of the strip 8 by the control winding 7. The load 17 is then energised. The compensating winding 15 is at the same time energised and tends to reopen the snap-action contacts. If the current in the compensating winding is then such that the bimetal 9 is heated just insufficiently to overcome the snap-action, the contacts 5 and 6 will remain just closed.

In this arrangement the cycle of operation of the thermal relay 4 depends upon the time delay in the complete control system including the furnace. Although such arrangements are useful in some applications, it is in general desirable that the mean input to the furnace shall be proportional over a limited range to the deviation of the furnace temperature from the control point.

In some applications of the arrangement it may be more convenient for the load 17 to be de-energised when the contacts 1 and 2 close and to be energised when said contacts are open; such operation may be obtained by interchanging the connection of contact 1 and the lower end of resistor 20, that is to say by connecting the contact 1 with the lower end instead of the upper end of the winding 19 in Fig. 1 and connecting the lower end of resistor 20 with the upper end of said winding.

The arrangement may be adjusted so that the contacts 5 and 6 operate from minimum to maximum output condition over a range of control quantity corresponding with the range of mean output of the control contacts from fully closed to fully open condition or vice versa, or so that the full range of relay output is obtained for a lesser range of mean output of the control contacts, or so that the relay output changes over only a portion of its range in response to variation of the mean output of the control contacts over the whole range of output thereof. In other words, the relay can be set so that its differential is either (a) under-compensated, (b) fully compensated, or (c) over-compensated. With on-off action of the control contacts 1, 2, that is to say no intermittent operation the relay acts as an on-off relay. For case (a) above, the time delays are rather long; for case (b) the time delays will be shorter, and for case (c) the relay will cycle with constant period (e. g. 90% and 10% on instead of 100% and 0% as for cases (a) and (b) aforesaid). There would, however, be no intermediate value of the cycling period (e. g. 50%), but with intermittent operation of the contacts the relay will cycle at intermediate values for cases (a), (b) and (c) above. The curves of percentage on time against temperature will be slightly different in each case and will be of the form shown in Fig. 4; the curve between temperature and output power of relay for the case in which the relay differential is under-compensated is indicated in chain line, that for the case in which the differential is fully compensated in full line, and that for the case in which the differential is over-compensated in dotted line. This is achieved by the positioning of bimetal 8 between the maximum and minimum by the mean current in the winding 7, this mean current being, of course, dependent on the percentage closed time of the control contacts 1 and 2.

In general, with a view to keeping the delay periods in the thermal relay of small magnitude, the maximum power available in the control winding 7 will be several times the amount necessary to operate the snap-action switch and the power in the compensating winding 15 will be less than that in the control winding by approximately said amount.

In the construction of thermal relay 4 shown in Figs. 2 and 3, the two bimetal strips 8 and 9 are mounted on an insulating base 30 by means of bent metal brackets 31 and 32 to which said strips are respectively bolted. The bracket 32 carries a threaded boss 33 in which is received an adjusting screw 34 which at its left-hand end bears against the bimetal strip 9 and thus provides for positional adjustment of the upper and free end of said strip.

The contact 5 is mounted on a screw-threaded stud 35 having engagement with a cup-shaped member 36 which is surrounded by an annular permanent magnet 37. The member 36 is riveted over the strip 8 and carries a flange 38 whereby to secure the intermediate member to the upper and free end of said strip 8. The contact 6 is carried by a spring blade 39 which at one end is secured by a bolt 40 to a strip of magnetic material 41 in turn bolted at 42 to the free end of the strip 9.

The magnet 37 co-operates with the magnetic strip 41 so as to provide snap-action of the contacts on opening and closing. The contact 6 is spring-mounted with respect to the plate 41 by means of the spring blade 39, the upper end of which is bent over the upper end of the strip 41 as can be seen at 43 in Figs. 2 and 3 so as to provide a limiting stop for the movement of the contact 6 away from the plate 41.

The stud 35, by determining the separation of the strip 41 from the magnet 37 in the closed position of the contacts, determines the differential of the relay, whilst the adjusting screw 34 determines the temperature to which the bimetal strip 8 must be raised above that of the strip 9 in order to cause the contacts to close.

The relay parts may be enclosed in a cover 44 secured to the base 30. The brackets 31 and 32 are preferably secured to the base 30 by terminal screws 45 and 46. Additional terminals such as 47 are provided for the windings 7 and 15.

In the foregoing it has been assumed that the control contacts will vibrate continuously, but it will be understood that the arrangement may be such that the cycle of events in the operation of the control contacts may comprise any two or all of the following intervals in sequence, namely an interval in which the contacts remain in engagement with one another, an interval in which the contacts vibrate in engagement with one another, and an interval in which the contacts remain open.

It will be understood that although in the arrangement above described a main relay of the contact-operating type is employed, said main relay may assume other forms, giving an output dependent on the condition of the vibrating control contacts, and preferably operating with an interrupted output, the mean effect of which varies with the mean output of the control contacts. For example, the main relay may comprise a thyratron arranged with an operating cycle comprising a variable number of conducting half-cycles of supply current depending on the mean output of the control contacts followed by a quiescent interval.

What I claim is:

1. A control system comprising in combination, a sensing element responsive to deviation of the magnitude of a controlled quantity from a control point, control contacts having means for vibrating them with a ratio of time for which they are closed to the period of their vibration cycle which is variable in response to said sensing element, a thermal relay having output contacts, at least one thermal element operatively connected with said output contacts, snap-action means coupled with said output contacts, and a heating circuit arrangement for said thermal relay including said control contacts and having a response time greater than a plurality of periods of said control contacts.

2. A control system comprising in combination, a sensing element responsive to deviation of the magnitude of a controlled quantity from a control point, control contacts having means for vibrating them with a ratio of time for which they are closed to the period of their vibration cycle which is variable in response to said sensing element, a thermal relay having output contacts, at least one thermal element operatively connected with said output contacts, snap-action means coupled with said output contacts, and a heating circuit arrangement for said thermal relay including said control contacts and having a response time greater than a plurality of periods of said control contacts, and including said output contacts and responsive to relative movement of said output contacts in each direction to change the heating of said relay in the sense to tend to reverse said relative movement.

3. A control system comprising in combination, a sensing element responsive to deviation of the magnitude of a controlled quantity from a control point, control contacts having means for vibrating them with a ratio of time for which they are closed to the period of their vibration cycle which is variable in response to said sensing element, a thermal relay having output contacts, at least one thermal element operatively connected with said output contacts, snap-action means coupled with said output contacts, and a heating circuit arrangement for said thermal relay including said control contacts and having a response time greater than a plurality of periods of said control contacts, and including said output contacts and responsive to relative movement of said output contacts in each direction to change the heating of said relay in the sense to reverse said relative movement and by an amount greater than corresponding with the differential of said snap-action means.

4. A control system comprising in combination, a sensing element responsive to deviation of the magnitude of a controlled quantity from a control point, control contacts at least one of which is provided with spring means mounting it for vibration with the ratio of time for which said contacts are closed to the period of the vibration cycle variable in response to said sensing element, a thermal relay having output contacts, at least one thermal element operatively connected with said output contacts, snap-action means coupled with said output contacts, and a heating circuit arrangement for said thermal relay including said control contacts and having a response time greater than a plurality of periods of said control contacts.

5. A control system comprising in combination, a sensing element responsive to deviation of the magnitude of a controlled quantity from a control point, control contacts having means for vibrating them with a ratio of time for which they are closed to the period of their vibration cycle which is variable in response to said sensing element, a thermal relay including a base member, first and second bimetal strips disposed at least substantially parallel with one another and having adjacent ends mounted on said base member, cooperating output contacts mounted on the free ends of said strips, respectively, snap-action means associated with said output contacts, first and second heating elements in thermal relation with said strips, respectively, for relatively moving said output contacts, said relay having a response time greater than a plurality of periods of said control contacts, and a heating circuit arrangement for said first heating element including said control contacts, and circuit connections between said output contacts and the second heating element.

6. A control system comprising in combination, a sensing element responsive to deviation of the magnitude of a controlled quantity from a control point, control contacts having means for vibrating them with a ratio of time for which they are closed to the period of their vibration cycle which is variable in response to said sensing element, a thermal relay including a base member, first and second bimetal strips disposed at least substantially parallel with one another and having adjacent ends mounted on said base member, cooperating output contacts mounted on the free ends of said strips, respectively, snap-action means associated with said output contacts, first and second heating elements in thermal relation with said strips, respectively, for relatively moving said output contacts, said relay having a response time greater than a plurality of periods of said control contacts, and a heating circuit arrangement for said first heating element including said control contacts, and circuit connections between said output contacts and the second heating element to change the heating of said relay in the sense to reverse relative movement of said output contacts and by an amount greater than corresponding with the differential of said snap-action means.

7. A control system comprising in combination, a sensing element responsive to deviation of the magnitude of a controlled quantity from a control point, control contacts having means for vibrating them with a ratio of time for which they are closed to the period of their vibration cycle which is variable in response to said sensing element, a thermal relay having output contacts, at least one thermal element operatively connected with said output contacts and having a heating element in thermal relation therewith, snap-action means coupled with said output contacts, and amplifying means having an input circuit including said control contacts and an output circuit including said heating element, said relay having a response time greater than a plurality of periods of said control contacts.

8. A control system comprising in combination, a sensing element responsive to deviation of the magnitude of a controlled quantity from a control point, control contacts having means for vibrating them with a ratio of time for which they are closed to the period of their vibration cycle which is variable in response to said sensing element, a thermal relay having output contacts, at least one thermal element having a heating element in thermal relation therewith and operatively connected with said output contacts for relatively moving them, snap-action means coupled with said output contacts, and amplifying means having an input circuit including said control contacts and an output circuit including said heating element, said relay having a response time greater than a plurality of periods of said control contacts and being responsive to relative movement of said output contacts in each direction to change the heating of said relay in the sense to tend to reverse said relative movement.

9. A control system comprising in combination, a sensing element responsive to deviation of the magnitude of a controlled quantity from a control point, control contacts having means for vibrating them with a ratio of time for which they are closed to the period of their vibration cycle which is variable in response to said sensing element, a thermal relay having output contacts, at least one thermal element operatively connected with said output contacts and having a heating element in thermal relation therewith, snap-action means coupled with said contacts, and amplifying means having an input circuit including said control contacts and an output circuit including said heating element, said relay having a response time greater than a plurality of periods of said control contacts and being responsive to relative movement of said output contacts in each direction to change the heating of said relay in the sense to reverse said relative movement and by an amount greater than corresponding with the differential of said snap-action means.

10. A control system comprising in combination, a sensing element responsive to deviation of the magnitude of a controlled quantity from a control point, control contacts having means for vibrating them with a ratio of time for which they are closed to the period of their vibration cycle which is variable in response to said sensing element, a thermal relay including a base member, first and second bimetal strips disposed at least substantially parallel with one another and having adjacent ends mounted on said base member, co-operating second contacts mounted on the free ends of said strips, respectively, snap-action means associated with said second contacts, first and second heating elements in termal relation with said strips, respectively, said relay having a response time greater than a plurality of periods of said control contacts, and electronic amplifying means having an input circuit including said control contacts and an output circuit including said first heating element, and circuit connections between said second contacts and said second heating element.

11. A control system comprising in combination, a sensing element responsive to deviation of the magnitude of a controlled quantity from a control point, control contacts having means for vibrating them with a ratio of time for which they are closed to the period of their vibration cycle which is variable in response to said sensing element, a thermal relay including a base member, first and second bimetal strips disposed at least substantially parallel with one another and having adjacent ends mounted on said base member, co-operating second contacts mounted on the free ends of said strips, respectively, snap-action means associated with said second contacts, first and second heating elements in thermal relation with said strips for relatively moving said second contacts, respectively, said relay having a response time greater than a plurality of periods of said control contacts, and electronic amplifying means having an input circuit including said control contacts and an output circuit including said first heating element, and circuit connections between said second contacts and second heating element to change the heating of said relay in the sense to reverse relative movement of said second contacts and by an amount greater than corresponding with the differential of said snap-action means.

References Cited in the file of this patent

FOREIGN PATENTS 538,118    Great Britain _____ July 22, 1941